United States Patent
Kim (10) Patent No.: US 6,330,218 B1
(45) Date of Patent: Dec. 11, 2001

(54) BALANCE GAIN TUNING APPARATUS CAPABLE OF CONNECTING ERRORS MADE IN MANUFACTURING PROCESS OF AN OPTICAL PICK UP

(75) Inventor: Chun-Sup Kim, Suwon-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/201,894

(22) Filed: Nov. 30, 1998

(30) Foreign Application Priority Data

Nov. 28, 1997 (KR) .................................................. 97-63859

(51) Int. Cl.[7] ........................................................ G11B 7/00
(52) U.S. Cl. ................................ 369/124.12; 369/124.01; 369/44.32
(58) Field of Search .............................. 369/44.41, 120, 369/124.1, 124.01, 44.28, 44.36, 44.35, 44.37, 44.42, 124.12, 124.02, 124.03, 44.32, 44.34, 53.34, 112.17, 44.23

(56) References Cited

U.S. PATENT DOCUMENTS

| | | | |
|---|---|---|---|
| 4,446,545 | * | 5/1984 | Van Dijk ............................. 369/44.36 |
| 4,736,354 | * | 4/1988 | Yoshio ................................ 369/44.21 |
| 4,932,015 | * | 6/1990 | Nagashima et al. ............... 369/44.11 |
| 5,287,338 | * | 2/1994 | Sato .................................... 369/44.23 |
| 5,587,985 | * | 12/1996 | Sano et al. ....................... 369/124.02 |
| 5,828,637 | * | 10/1998 | Kim .................................... 369/44.28 |
| 5,886,964 | * | 3/1999 | Fujita ................................. 369/44.37 |
| 5,905,703 | * | 5/1999 | Osada ................................. 369/44.41 |
| 5,963,515 | * | 10/1999 | Shindo ............................... 369/44.23 |
| 5,974,010 | * | 10/1999 | Sakanushi .......................... 369/44.41 |

* cited by examiner

Primary Examiner—David Hudspeth
Assistant Examiner—Kim-Kwok Chu
(74) Attorney, Agent, or Firm—Sughrue, Mion, Zinn, Macpeak & Seas, PLLC

(57) ABSTRACT

A balance gain tuning apparatus including a first amplifying part amplifying one of signals output from a optical pickup to a fixed gain; a second amplifying part amplifying another signal of the signals output from the optical pickup to a tunable gain;

a subtracting part producing a difference of an output of the first amplifying part and that of the second amplifying part; and a servo control part tuning the gain of the second amplifying part in response to an output of the subtracting part.

11 Claims, 6 Drawing Sheets

FIG. 1

PRIOR ART

FIG. 2

PRIOR ART

BALANCE GAIN TUNING APPARATUS CAPABLE OF CONNECTING ERRORS MADE IN MANUFACTURING PROCESS OF AN OPTICAL PICK UP

BACKGROUND OF THE INVENTION

1. Field of the Invention

The present invention relates to an optical disk reproducing unit and more particularly, to a unit for processing signals from a optical pickup.

2. Description of the Related Art

Figure 1:
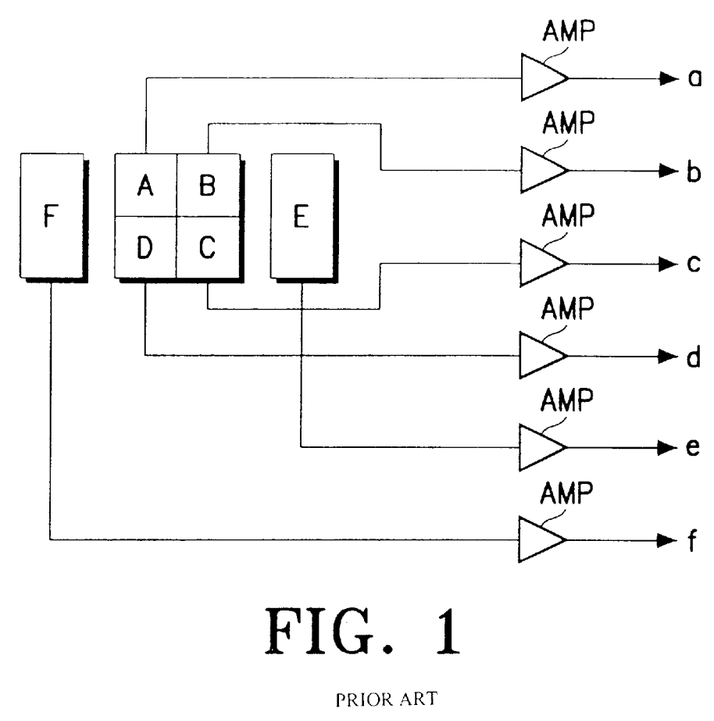
FIG. 1 depicts light receiving parts of a conventional optical pickup.

FIG. 1 depicts light receiving parts of a conventional optical pickup. The optical pickup has light receiving parts A, B, C, D, E and F. Each of them produces an output signal upon receipt of light. The output signals are amplified through corresponding amplifiers AMP to be produced as a, b, c, d, e and f. The focus exactness is detected with a gain difference between the addition of signals a and c and that of signals b and d in the above a, b, c and d. In addition, a degree by which the optical pickup is deviated from a track is detected by using a gain difference of the above signals e and f. A servo controls the optical pickup in accordance with the focus exactness and the information of optical pickup deviation. Errors of more than 10% may be made in output signals a, b, c, d, e and f from light receiving parts A, B, C, D, E and F by the mismatch with respect to those light receiving parts that may occur in the process of manufacturing the optical pickup. That is, during the manufacturing of the optical pickup, its light receiving parts A, B, C, D, E and F may be mismatched. The above errors serve as an offset of the server for controlling the optical pickup, which becomes problematic in a high-speed and high-precision optical disk player.

Figure 2:
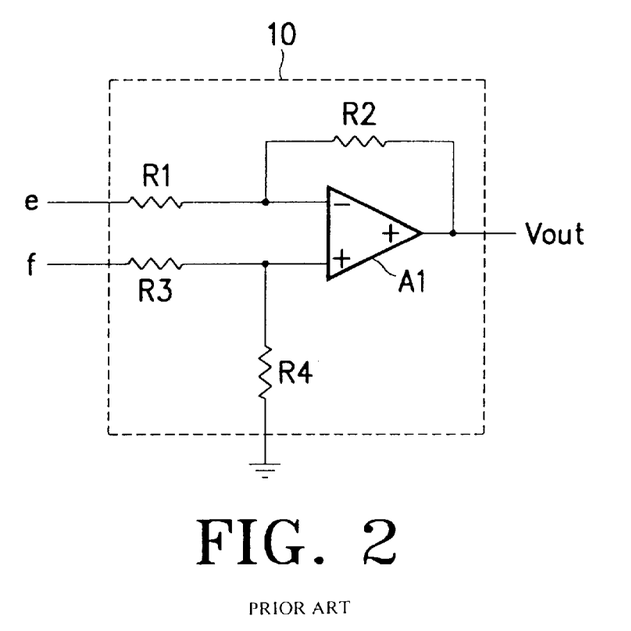
FIG. 2 is a circuit diagram of a conventional tracking error sensing unit.

Referring to FIG. 2, depicting a circuit sensing the optical pickup deviation degree by the use of signals e and f (hereinafter, a tracking error sensing unit), signal e is input to an inverting input terminal of a differential amplifier A1 through a resistor R1. Signal f is input to a non-inverting terminal of differential amplifier A1 through a resistor R3. Differential amplifier A1's output terminal is connected to its inverting input terminal through a resistor R2. The tracking error sensing unit produces a difference of signals e and f, and the transfer characteristics are expressed by equation 1:

$$Vout = -\frac{R2}{R1}e + \frac{1+\frac{R2}{R1}}{1+\frac{R3}{R4}}f \quad \text{[Equation 1]}$$

The above signal Vout is indicative of a difference of signals e and f and is input to a control device controlling the optical pickup. The control device controls to make the optical pickup keep the track with signal Vout.

If there is an error by the mismatch that may occur in the optical pickup manufacturing process, the conventional tracking error sensing unit does not exactly detect a tracking error with signals e and f.

As described above, there may be a mismatch with respect to light receiving parts A, B, C, D, E and F in the manufacture of the optical pickup, and errors of more than 10% may be made in its output signal by the mismatch. The errors serve as an offset of the servo for controlling the optical pickup, which becomes problematic in a high-speed and high-precision optical disk player.

SUMMARY OF THE INVENTION

Accordingly, an object of the present invention is to provide a balance gain tuning apparatus which can correct errors made in the manufacturing process of an optical pickup.

To achieve the above object of the present invention, there is provided a balance gain tuning apparatus including a first amplifying part amplifying one of signals output from a optical pickup to a fixed gain; a second amplifying part amplifying another signal of the signals output from the optical pickup to a tunable gain; a subtracting part producing a difference of an output of the first amplifying part and that of the second amplifying part; and a servo control part tuning the gain of the second amplifying part in response to an output of the subtracting part.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiments of the present invention.

The inventive balance gain tuning circuit corrects a mismatch that may occur in the manufacturing process of an optical pickup by amplifying an output signal from an optical pickup and controlling its gain.

Figure 3:
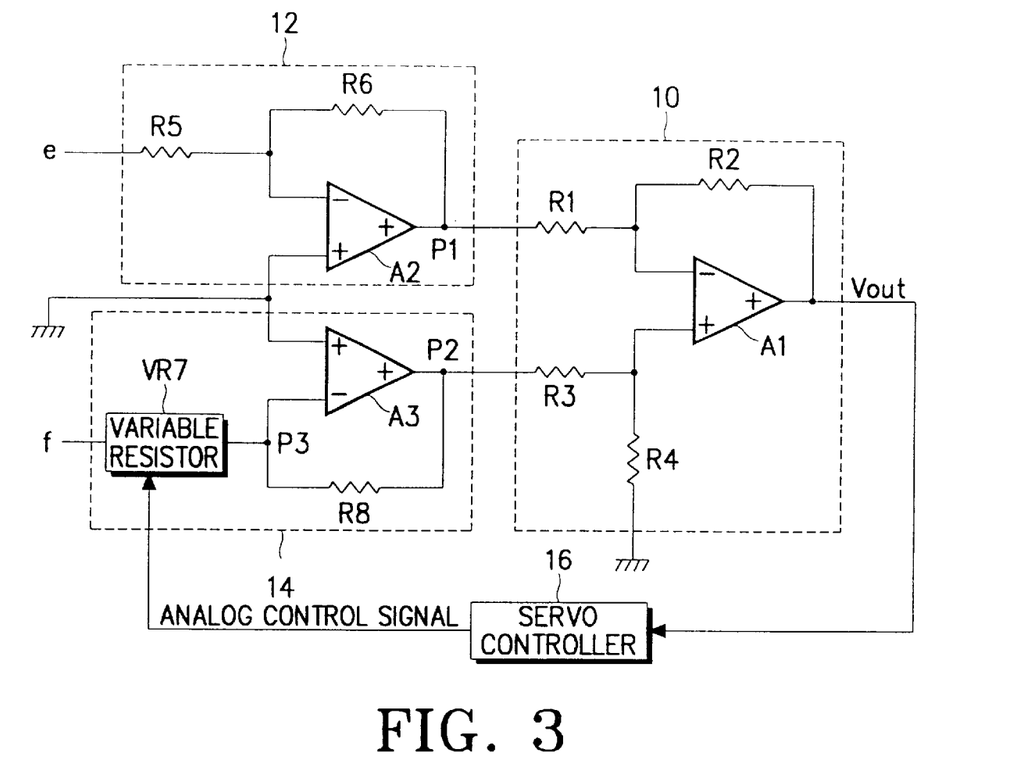
FIG. 3 is a circuit diagram of a balance gain tuning apparatus in accordance with a preferred embodiment of the present invention.

Referring to FIG. 3, the balance gain tuning apparatus of the preferred embodiment of the present invention includes a subtracter 10, a first amplifying part 12, a second amplifying part 14, and a servo controller 16. First amplifying part 12 amplifies an input signal e to a fixed gain, thus producing an output P1, and second amplifying part 14 amplifies an input signal f to a tunable gain, thus producing an output P2. Second amplifying part 14's gain is set equally to first amplifying part 12's gain at an initial stage where a gain has not been tuned yet. Signals P1 and P2 are applied to subtracter 10, and subtracter 10 produces Vout by computing a difference of P1 and P2. Vout is applied to servo controller 16, and servo controller 16 receives Vout at the initializing step to apply the analog control signal, used for correcting mismatch of signals e and f in response to Vout, to second amplifying part 14. Second amplifying part 14 tunes a gain in response to the analog control signal, produced from servo controller 16, thus correcting the mismatch of signals e and f More particularly, first amplifying part 12 consists resistors R5, R6, and amplifier A2, and amplifies input signal e, thus producing P1. First amplifying part 12's transfer function is expressed by equation 2:

$$P1 = \frac{R6}{R5}e \qquad \text{[Equation 2]}$$

Second amplifying part 14 includes a variable resistor VR7, a resistor R8, and an amplifier A3, and amplifies an input signal f to produce an output P2. First amplifying part 12's transfer function is expressed by equation 3:

$$P2 = \frac{R8}{VR7}f \qquad \text{[Equation 3]}$$

Variable resistor VR7 is used for correcting a mismatch with respect to light receiving parts E and F. Variable resistor VR7 has a resistance value that is varied with the analog control signal from servo controller 16. Signal e's gain is tuned by controlling variable resistor VR7 according to a degree of the mismatch with respect to light receiving parts E and F. Even if the mismatch is made in E and F, it can be corrected by varying each gain in accordance with the mismatch degree when amplifying signals e and f. Variable resistor VR7 can be replaced with resistor R5 to control signal e's gain without varying signal f's gain. Variable resistor VR7 is not provided to resistor R6 or resistor R8 in order to compensate a delay of signals e and f that may occur by feedback resistor R6 connected to amplifier A2 or feedback resistor R8 connected to amplifier A3 to reduce the switch noise. In addition, the time constant of the capacitance that can be used for resistor R6 or resistor R8 shall be the same to compensate the delay of signals e and f.

Outputs P1 and P2 are applied to subtracter 10. Subtracter 10 consists of resistors R1, R2, R3, R4 and a differential amplifier A1. Output P1 is input to differential amplifier A1's inverting input terminal through resistor R1, and P2 is applied to differential amplifier A1's non-inverting input terminal through resistor R3. Differential amplifier A1's output terminal is connected to its inverting input terminal through resistor R2. The non-inverting input terminal of differential amplifier A1 is grounded through resistor R4. Subtracter 10 detects a difference of outputs P1 and P2, and its transfer function is expressed by equation 4:

$$Vout = -\frac{R2}{R1}P1 + \frac{1+\frac{R2}{R1}}{1+\frac{R3}{R4}}P2 \qquad \text{[Equation 4]}$$

Figure 7:
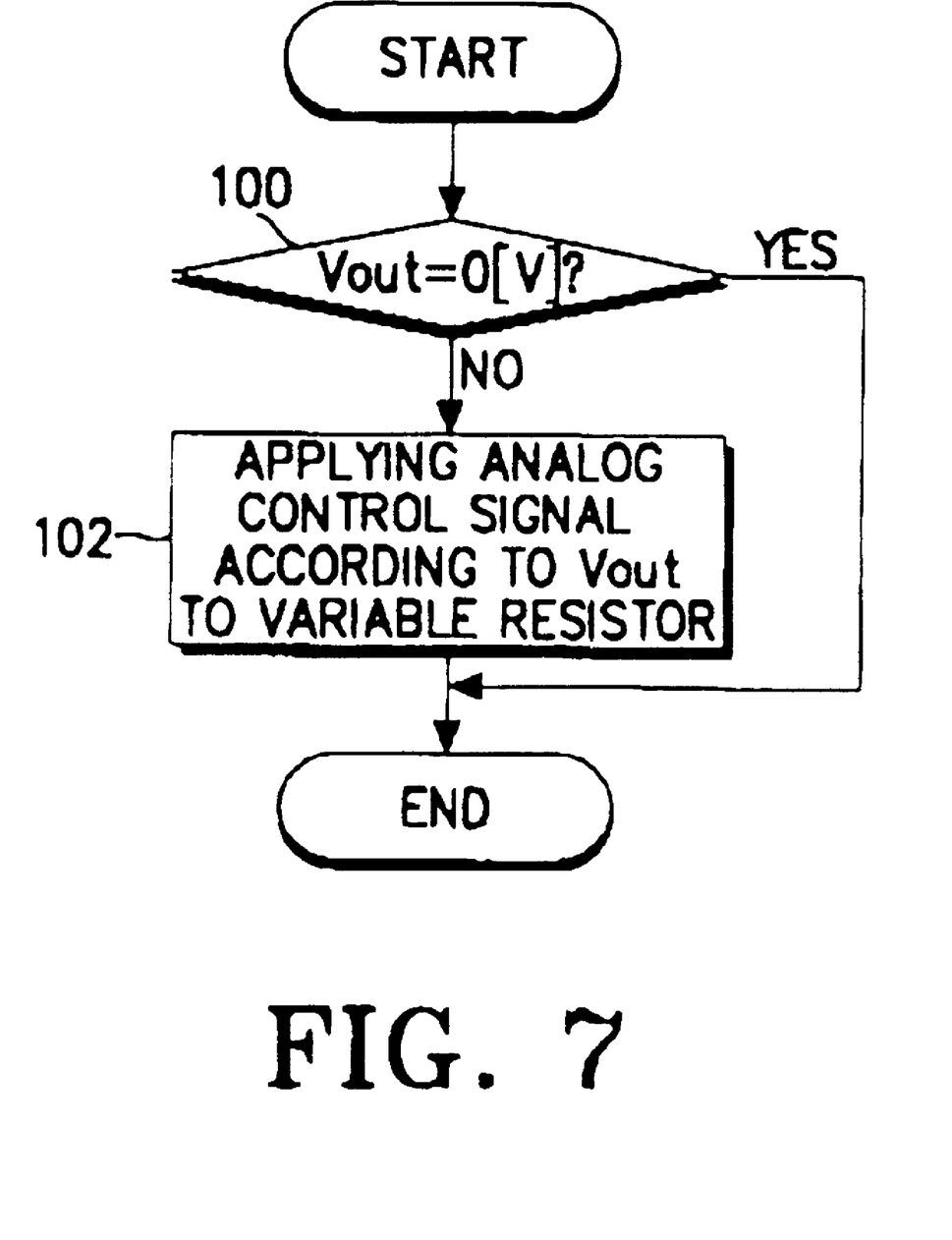
FIG. 7 is a control sequence of a servo controller of FIG. 4.

Vout is applied to servo controller 16. Servo controller 16 performs the processing program at the initializing step, as shown in FIG. 7. Servo controller 16 determines if Vout is 0 (zero) V (S100) at the initializing step. When Vout is 0 (zero) V, servo controller 16 determines that the mismatch does not occur, and when Vout is not 0 (zero) V, servo controller 16 determines that the mismatch occurs and then goes to step 102. At step 102, servo controller 16 detects the information of a difference of signals P1 and P2, and produces an analog control signal for tuning second amplifying part 14's gain to make signals P1 and P2 equal in amplitude. The analog control signal is applied to variable resistor R7 of second amplifying part 14.

Tuning a gain when amplifying signal f is more fully described. Second amplifying part 14 receives from servo controller 16 an analog control signal for correcting the mismatch with respect to light receiving parts E and F. Variable resistor VR7 of second amplifying part 14 has a resistance value that is varied with the analog control signal. Since the gain is inversely proportional to the variable resistor VR7 according to the equation 3, the gain is tuned as the resistance value of variable resistor VR7 is changed by the analog control signal.

Figure 4:
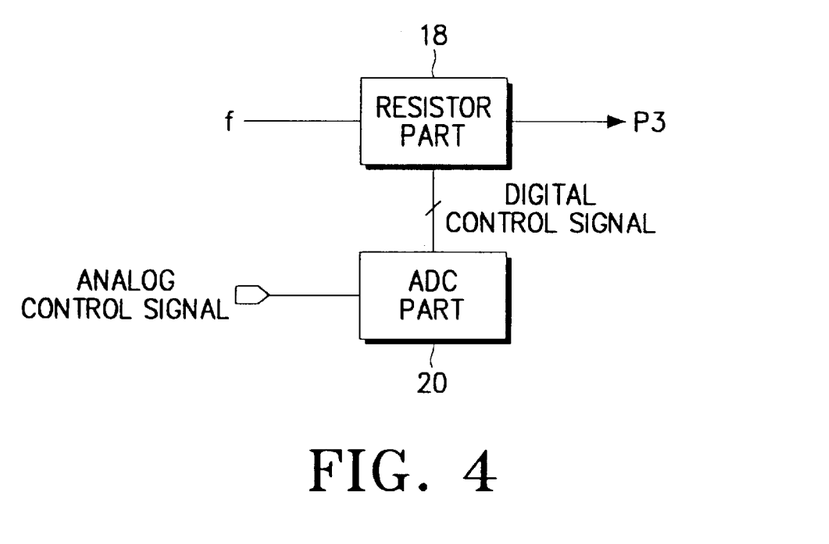
FIG. 4 is a block diagram of a variable resistor of FIG. 3.

Referring to FIG. 4, depicting the block diagram of variable resistor VR7 that has the resistance value changed by the analog control signal, variable resistor VR7 includes an analog-to-digital converting (ADC) part 20 converting the analog control signal into a digital control signal; and a resistor part 18 varying the resistance value upon receipt of the digital control signal.

Figure 5:
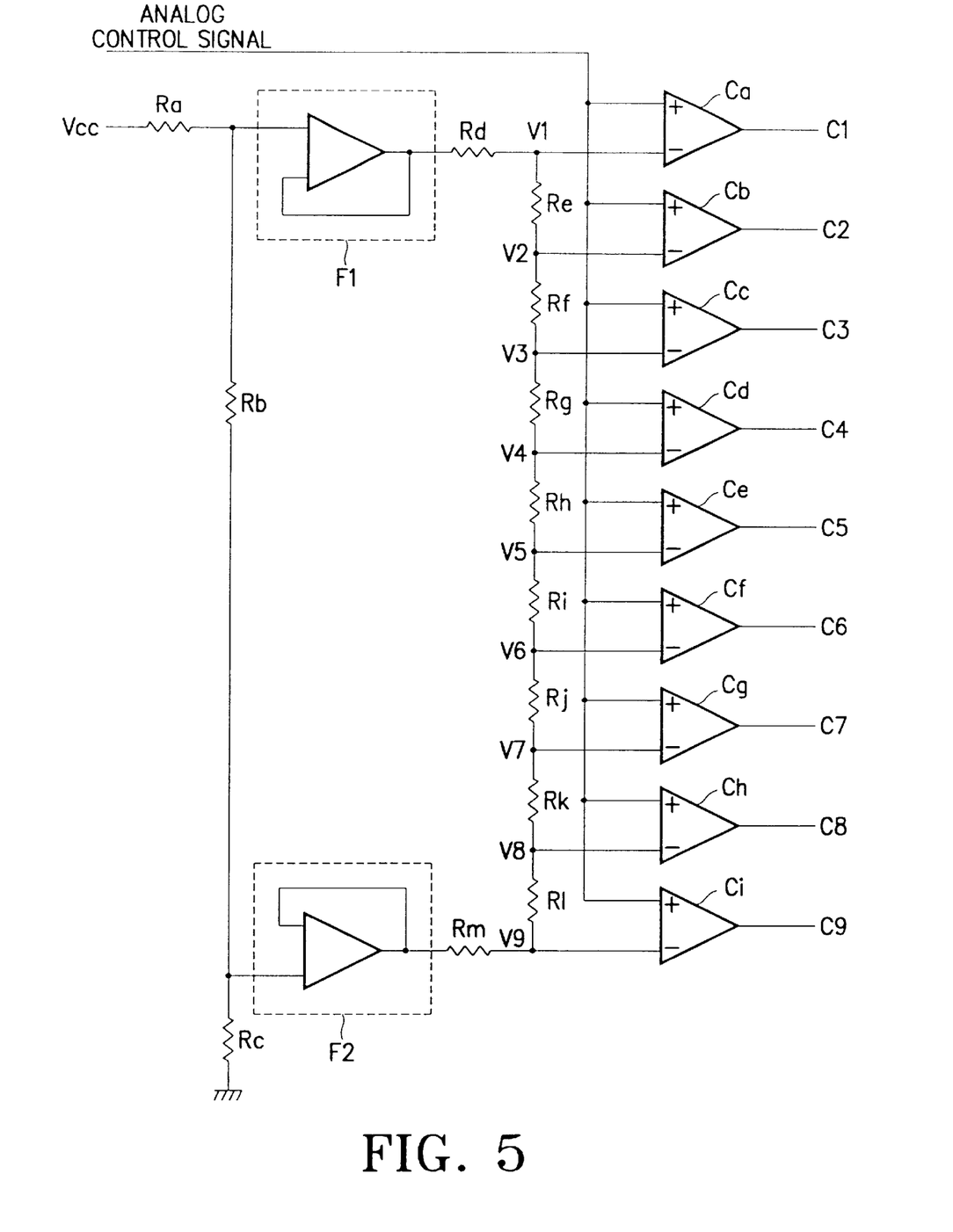
FIG. 5 is a detailed view of an analog-to-digital converting (ADC) part of FIG. 4.

The operation of ADC part 20 is now described referring to FIG. 5. Vcc is grounded through resistors Ra, Rb and Rc. A voltage between resistors Ra and Rb is input to a unit-gain follower F1 and a voltage between resistors Rb and Rc is input to a unit-gain follower F2. Unit-gain follower F1's output drops to a voltage V1 by resistor Rd, and voltage V1 is reduced to a voltage V2 by a resistor Re. V2 is decreased to a voltage V3 by a resistor Rf, and voltage V3 drops to a voltage V4 by Rg. Voltage V4 is decreased to a voltage V5, and voltage V5 drops to a voltage V6 by a resistor Ri. Voltage V6 drops to a voltage V7 by resistor Rj. Voltage V7 is reduced to a voltage V8 by resistor Rk, and voltage V8 drops to a voltage V9 by resistor Rl. Voltage V9 is connected to an output terminal of unit-gain floor F2 through resistor Rm.

Voltage V1 and the analog control signal are respectively applied to a comparator Ca's inverting input terminal and non-inverting input terminal. Comparator Ca produces a high-level output C1 if the analog control signal is larger than voltage V1. Voltage V2 and the analog control signal are respectively input to a comparator Cb's inverting input terminal and non-inverting input terminal. Comparator Cb produces a high-level output C2 if the analog control signal is larger than voltage V2. Voltage V3 and the analog control signal are each applied to a comparator Cc's inverting input terminal and non-inverting input terminal. Comparator Cc produces a high-level output C3 if the analog control signal is larger than voltage V3. Voltage V4 and the analog control signal are each applied to a comparator Cd's inverting input terminal and non-inverting input terminal. Comparator Cd produces a high-level output C4 if the analog control signal is larger than voltage V4. Voltage V5 and the analog control signal are each applied to a comparator Ce's inverting input terminal and non-inverting input terminal. Comparator Ce produces a high-level output C5 if the analog control signal is larger than voltage V5. Voltage V6 and the analog control signal are each applied to a comparator Cf's inverting input terminal and non-inverting input terminal. Comparator Cf produces a high-level output C6 if the analog control signal is larger than voltage V6. Voltage V7 and the analog control signal are each applied to a comparator Cg's inverting input terminal and non-inverting input terminal. Comparator Cg produces a high-level output C7 if the analog control signal is larger than voltage V7. Voltage V8 and the analog control signal are each applied to a comparator Ch's inverting input terminal and non-inverting input terminal. Comparator Ch produces a high-level output C8 if the analog control signal is larger than voltage V8. Voltage V9 and the analog control signal are each applied to a comparator Ci's inverting input terminal and non-inverting input terminal. Comparator Ci produces a high-level output C9 if the analog control signal is larger than voltage V9. Output signals C1, C2, C3, C4, C5, C6, C7, C8, and C9 are converted into digital control signals and applied to resistor part 18.

Voltages V1 and V9 are each 3.5V and 1.5V, and each voltage V1, V2, V3, V4, V5, V6, V7, V8, and V9 has a given potential difference by controlling each resistance value of resistors Ra, Rb, Rc, Rd, Re, Rf, Rg, Rh, Ri, Rj, Rk, Rl, and Rm. As described above, the analog control signal is converted into the 9-bit digital control signal, and may be converted into digital one of more than 9 bits by reducing the given potential difference.

Each comparator Ca, Cb, Cc, Cd, Ce, Cf, Cg, Ch, and Ci has a hysteresis to prevent a malfunction that may happen by noise, and the technique as to the comparators has been widely used.

Figure 6:
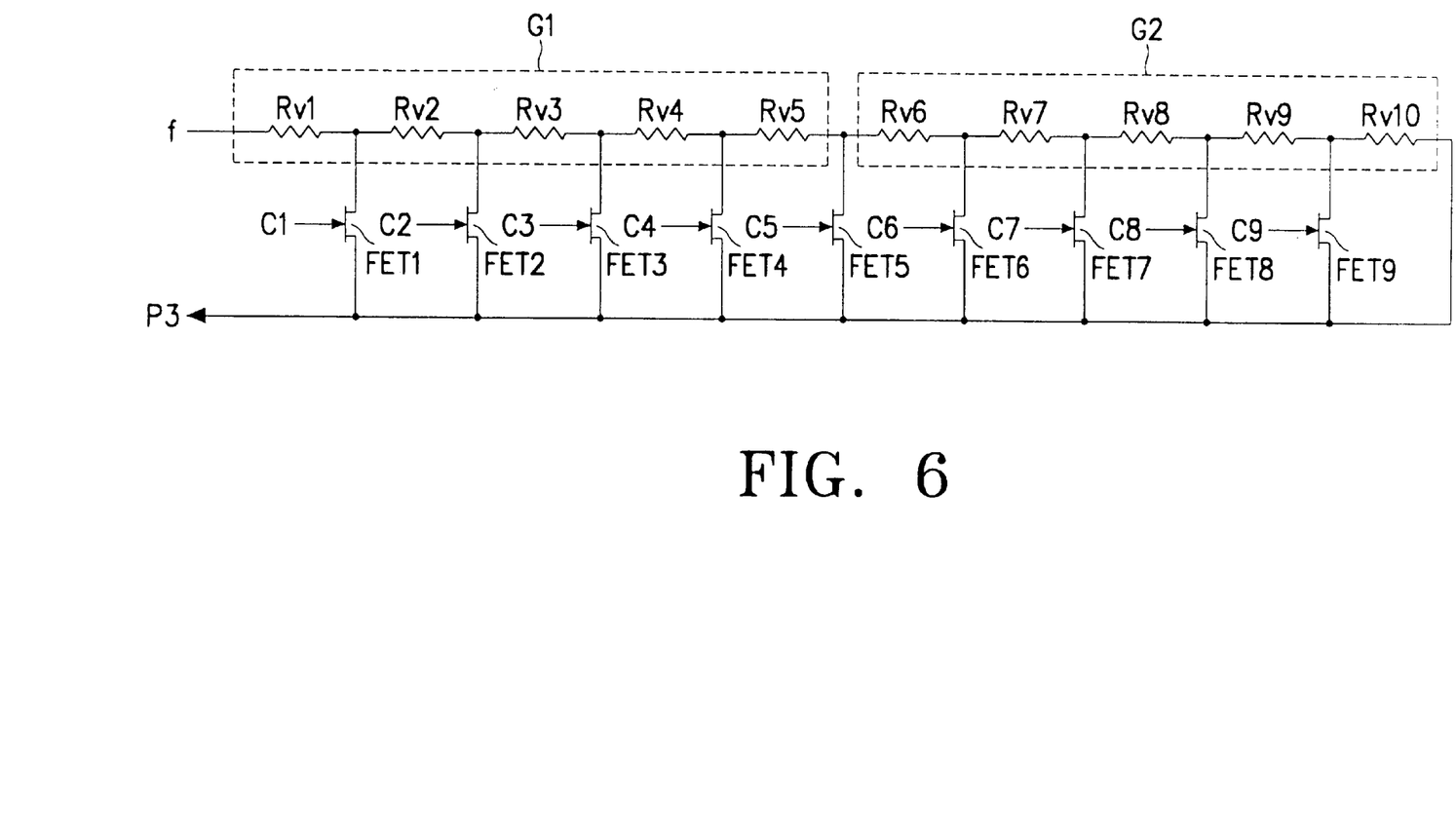
FIG. 6 is a detailed view of the resistor of FIG. 4.

Referring to FIG. 6, depicting the detailed circuit diagram of resistor part 18, resistors Rv1, Rv2, Rv3, Rv4, Rv5, Rv6, Rv7, Rv8, Rv9, and Rv10 are connected in series between f input terminal and P3 output terminal. A field effect transistor (FET) 1 has a drain connected between resistors Rv1 and Rv2, and a source connected to P3 output terminal. When high-level signal C1 is input to its gate, resistors Rv1 and Rv2 are connected to P3 output terminal. An FET 2 has a drain connected between resistors Rv2 and Rv3, and a source connected to P3 output terminal, and when high-level signal C2 is applied to its gate, resistors Rv2 and Rv3 are connected to P3 output terminal. An FET 3 has a drain connected between resistors Rv3 and Rv4, and a source connected to P3 output terminal. When high-level signal C3 is applied to its gate, resistors Rv3 and Rv4 are connected to P3 output terminal. An FET 4 has a drain connected between resistors Rv4 and Rv5, and a source connected to P3 output terminal. When high-level signal C4 is applied to its gate, resistors Rv4 and Rv5 are connected to P3 output terminal. An FET 5 has a drain connected between resistors Rv5 and Rv6, and a source connected to P3 output terminal. When high-level signal C5 is applied to its gate, resistors Rv5 and Rv6 are connected to P3 output terminal.

An FET 6 has a drain connected between resistors Rv6 and Rv7, and a source connected to P3 output terminal. When high-level signal C6 is applied to its gate, resistors Rv6 and Rv7 are connected to P3 output terminal. An FET 7 has a drain connected between resistors Rv7 and Rv8, and a source connected to P3 output terminal. When high-level signal C7 is applied to its gate, resistors Rv7 and Rv8 are connected to P3 output terminal. An FET 8 has a drain connected between resistors Rv8 and Rv9, and a source connected to P3 output terminal. When high-level signal C8 is applied to its gate, resistors Rv8 and Rv9 are connected to P3 output terminal. An FET 9 has a drain connected between resistors Rv9 and Rv10, and a source connected to P3 output terminal. When high-level signal C9 is applied to its gate, resistors Rv9 and Rv10 are connected to P3 output terminal.

The connecting state of the respective resistors Rv1, Rv2, Rv3, Rv4, Rv5, Rv6, Rv7, Rv8, Rv9, and Rv10 is varied with the digital control signals C1 to C9 that are each applied to gates of FET 1 to FET 9. If C1 attains a high level and the rest of the digital control signals are in a low state, resistors Rv2 to Rv10 except for resistor Rv1 are coupled in series to one another. The serially-connected resistors Rv2 to Rv10 are connected to resistor Rv1 in parallel. As described above, the connecting state of the respective resistors Rv1, Rv2, Rv3, Rv4, Rv5, Rv6, Rv7, Rv8, Rv9, and Rv10 is changed in accordance with the applied digital control signals so the combined resistance value of resistors Rv1, Rv2, Rv3, Rv4, Rv5, Rv6, Rv7, Rv8, Rv9, and Rv10 becomes changed.

Since the gain of second amplifying part 14 is inversely proportional to the combined resistance value, a decrement of the combined resistance value shall be small when the gain is decreased, and an increment of the combined resistance value shall be large in order to increase this gain linearly. For this, resistors Rv1, Rv2, Rv3, Rv4, Rv5, Rv6, Rv7, Rv8, Rv9, and Rv10 are divided into a first group G1 and a second group G2, and each resistor group has a different resistance value. For example, the resistance value of respective resistors Rv1, Rv2, Rv3, Rv4, and Rv5 of first group G1 is 4K3, and the resistance value of respective resistors Rv6, Rv7, Rv8, Rv9, and Rv10 of second group G2 is 7K3.

As can be appreciated from the foregoing descriptions, the errors of the signals e and f due to the mismatch of the light receiving parts caused in the manufacture of the optical pickup are corrected in the first and the second amplifying parts 12 and 14, respectively. Therefore, the first and second amplifying parts 12 and 14 output the error corrected signals P1 and P2.

Figure 8:
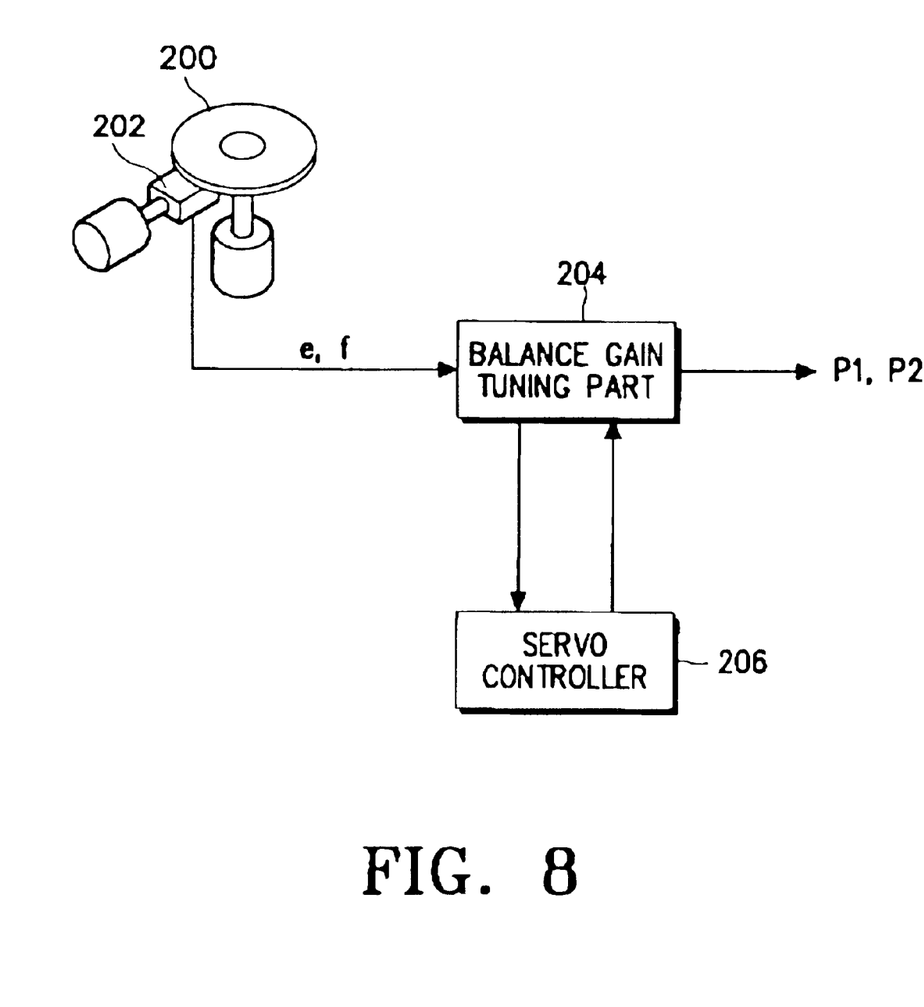
FIG. 8 is a schematic block diagram of an optical disk reproducing apparatus with the balance gain tuning apparatus in accordance with a preferred embodiment of the present invention.

FIG. 8 illustrates a schematic block diagram of an optical disk reproducing apparatus with the above-mentioned balance gain tuning apparatus, in which the elements not related to the present invention are omitted.

Referring to FIG. 8, an optical pickup 202 picks up information recorded in an optical disk 200 by using the light receiving parts A, B, C, D, E, and F and converts the picked up information to electric signals a, b, c, d, e, and f. Among those electric signals, signals e and f are supplied to a balance gain tuning part 204. Here, although the optical disk reproducing apparatus may include a plurality of the balance gain tuning parts in order to correct the errors of all the signals a, b, c, d, e, and f due to the mismatch of the light emitting parts caused in the manufacture of the optical pickup, FIG. 8 shows a case, by way of example, in which the optical disk reproducing apparatus corrects the errors of the signals e and f by using a single balance gain tuning part 204. The balance gain tuning part 204 corresponds to the first amplifying part 12, the second amplifying part 14 and the subtracter 10 of FIG. 3.

The balance gain tuning part 204 amplifies, at first, the input signals e and f with a predetermined gin to output the signal P1 and P2, and evaluates a difference value between the signals P1 and P2 to provide a servo controller 206 with the difference value. The servo controller 206 generates an analog control signal for correcting the errors of the signals e and f depending on the difference value and provides the balance gain tuning part 204 with the generated analog control signal. The balance gain tuning part 204 tunes a gain for the signal f according to the analog control signal. Subsequently, the balance gain tuning part 204 amplifies the signal e with the predetermined gain to output the signal P1 and amplifies the signal f with the tuned gain to output the signal P2. In this manner, the signals e and f are corrected to the error-free signals P1 and P2. The signals P1 and P2 may be used in detecting a deviation of the optical pickup 202 from the track.

As described above, the balance gain tuning apparatus of the present invention is capable of correcting a mismatch made in the manufacture of the optical pickup by tuning the gain of a signal produced from the optical pickup. Thus, the present invention assures high speed performance and high precision of an optical disk player.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

I claim:

1. A balance gain adjusting apparatus comprising:
   a first amplifier circuit which amplifies one of signals for sensing tracking error to a fixed gain;
   a second amplifier circuit which amplifies another signal of the signals for sensing tracking error to an adjustable gain;
   a subtractor circuit which computes a difference of an output of the first amplifier circuit and that of the second amplifier circuit; and
   a controller which adjusts the gain of the second amplifier circuit in response to an output of the subtractor circuit.

2. The balance gain adjusting apparatus as claimed in claim 1, further comprising an input terminal which receives the signals for sensing tracking error, wherein the second amplifier circuit comprises:
   an amplifier having an inverting input terminal receiving another signal of the signals for sensing tracking error, and a non-inverting input terminal grounded;
   a variable resistor connected between the input terminal which receives the signals for sensing tracking error and said amplifier's inverting input terminal for adjusting the gain, and has a resistance value changed under the control of the controller; and
   a resistor connected between said amplifier's inverting input terminal and output terminal, and determining a gain of said amplifier with the variable resistor.

3. A balance gain adjusting apparatus comprising:
   a first amplifier circuit which amplifies one of signals for sensing tracking error to a fixed gain;
   a second amplifier circuit which amplifies another signal of the signals for sensing tracking error to a predetermined gain, and amplifies said signal to a gain in response to an analog control signal;
   a subtractor circuit which computes a difference of an output of the first amplifier circuit and that of the second amplifier circuit; and
   a controller which received an output of the subtractor circuit at an initializing stage, and produces an analog control signal for adjusting the gain of the second amplifier circuit in response to said output of the subtractor circuit.

4. The balance gain adjusting apparatus as claimed in claim 3, further comprising an input terminal which receives the signals for sensing tracking error, wherein the second amplifier circuit comprises:
   an amplifier having an inverting input terminal receiving another signal of the signals for sensing tracking error, and a non-inverting input terminal grounded;
   a variable resistor connected between the input terminal which receives the signals for sensing tracking error and said amplifier's inverting input terminal for adjusting the gain, and having a resistance value changed by the analog control signal; and
   a resistor connected between said amplifier's inverting input terminal and output terminal, and determining a gain of said amplifier with the variable resistor.

5. The balance gain adjusting apparatus as claimed in claim 4, wherein the variable resistor comprises:
   an analog-digital converter which converts an analog control signal into a digital signal;
   resistors serially connected between said inverting input terminal receiving another signal of the signals, and said amplifier's inverting terminal; and
   a switching circuit connected between the resistors and said amplifier's inverting input terminal, and varying a combined resistance value of the resistors by making or breaking the connections between the respective resistors and the second amplifier circuit's inverting input terminal in response to said digital signal.

6. The balance gain adjusting apparatus as claimed in claim 5, wherein said switching circuit comprises field effect transistors.

7. The balance gain adjusting apparatus as claimed in claim 5, wherein said analog-digital converter comprises:
   resistors each reducing input voltages to a given level; and
   comparators comparing each of the reduced voltages with the analog control signal, and producing a result from the comparison as a digital control signal.

8. The balance gain adjusting apparatus as claimed in claim 7, wherein the comparators each have a hysterisis.

9. An optical disk reproducing apparatus comprising:
   an optical pickup for detecting information recorded in an optical disk by using a plurality of light receiving elements and converting the detected information to signals for sensing tracking error;
   a balance gain adjusting circuit for amplifying, at first, the signals for sensing tracking error with a predetermined gain to evaluate a difference value between the amplified signals, adjusting a gain according to a control signal, and amplifying the signals for sensing tracking error with the adjusted gain; and
   a controller for generating said control signal for adjusting the gain to correct errors of the amplified signals according to the difference value output form the balance gain adjusting circuit.

10. An optical disk reproducing apparatus comprising:
    an optical pickup for detecting information recorded in an optical disk by using a plurality of light receiving elements and converting the detected information to signals for sensing tracking error;
    a balance gain adjusting circuit for amplifying, at first, any two of the signals for sensing tracking error with a predetermined gain to evaluate a difference value between the amplified signals, adjusting a gain for a selected one of the two signals according to a control signal, and amplifying the selected signal with the adjusted gain and the other signal with said predetermined gain; and
    a controller for generating said control signal for adjusting the gain to correct errors of the amplified signals according to the difference value output from the balance gain adjusting circuit.

11. A balance gain adjusting apparatus comprising:
    a first circuit which adjusts one of signals for sensing tracking error to a fixed gain;
    a second circuit which adjusts another signal of the signals for sensing tracking error to an adjustable gain;
    a third circuit which computes a difference of an output of the first circuit and that of the second circuit; and
    a controller which adjusts the gain of the second circuit in response to an output of the third circuit.

* * * * *